United States Patent
Nakagawa et al.

(10) Patent No.: US 9,061,618 B2
(45) Date of Patent: Jun. 23, 2015

(54) VEHICLE SEAT

(71) Applicant: TOYOTA BOSHOKU KABUSHIKI KAISHA, Aichi-ken (JP)

(72) Inventors: Tetsuo Nakagawa, Miyoshi (JP); Tomoaki Nagata, Nagoya (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 161 days.

(21) Appl. No.: 13/676,641

(22) Filed: Nov. 14, 2012

(65) Prior Publication Data

US 2013/0119730 A1 May 16, 2013

(30) Foreign Application Priority Data

Nov. 15, 2011 (JP) ................. 2011-249349

(51) Int. Cl.
*B60N 2/58* (2006.01)

(52) U.S. Cl.
CPC ............... *B60N 2/5841* (2013.01); *B60N 2/58* (2013.01); *B60N 2/5825* (2013.01)

(58) Field of Classification Search
CPC ...... B60N 2/58; B60N 2/5825; B60N 2/6027; B60N 2/6045; B60N 2/5841; A47C 31/023
USPC ........ 297/452.6, 452.62, 218.2, 218.3–218.5, 297/452.59; 5/407; 24/DIG. 37
See application file for complete search history.

(56) References Cited

U.S. PATENT DOCUMENTS

| | | | |
|---|---|---|---|
| 3,794,378 A * | 2/1974 | Haslam et al. | 297/452.6 |
| 3,981,534 A * | 9/1976 | Wilton | 297/218.1 |
| 5,195,222 A * | 3/1993 | Rink | 24/581.11 |
| 5,605,373 A * | 2/1997 | Wildern et al. | 297/218.4 |
| 5,641,552 A * | 6/1997 | Tillner | 428/102 |
| 6,048,025 A * | 4/2000 | Tillner | 297/218.1 |
| 7,506,939 B2 * | 3/2009 | Brockschneider et al. | 297/452.6 |
| 7,559,100 B2 * | 7/2009 | Pedde et al. | 5/407 |
| 7,891,735 B2 * | 2/2011 | Oku | 297/218.3 |
| 7,901,002 B2 * | 3/2011 | Mashimo | 297/218.3 |

FOREIGN PATENT DOCUMENTS

JP 05-031699 4/1993

* cited by examiner

*Primary Examiner* — David R Dunn
*Assistant Examiner* — Tania Abraham
(74) *Attorney, Agent, or Firm* — Greenblum & Bernstein, P.L.C.

(57) ABSTRACT

A first pressing surface and a second pressing surface are formed on at least one of an engaging portion and an engagable portion. When a force in a first direction is applied to the first pressing surface, or when a force from a second direction that is a direction different than the first direction is applied to the second pressing surface, the engaging portion or the engagable portion on which the first pressing surface and the second pressing surface are formed are displaced to a predetermined form, such that the engaging portion and the engagable portion disengage.

7 Claims, 8 Drawing Sheets

VEHICLE SEAT

INCORPORATION BY REFERENCE

The disclosure of Japanese Patent Application No. 2011-249349 filed on Nov. 15, 2011 including the specification, drawings and abstract is incorporated herein by reference in its entirety.

BACKGROUND OF THE INVENTION

1. Field of the Invention

The invention relates to a vehicle seat provided with a seat cover that is attached to a base member.

2. Description of Related Art

Japanese Utility Model Application Publication No. 5-31699 (JP 5-31699 U) describes a vehicle seat in which a seat cover (trim) is able to be easily removed. More specifically, a trim set piece that sandwiches a wire provided in a groove in a seat pad is provided on a seat cover, and this trim set piece is able to be detached from the wire by elastically deforming the trim set piece.

However, with the vehicle seat described in JP 5-31699 U, the seat cover is only able to be removed by an operation from one direction (the open side if the groove). Therefore, the engaging portion (i.e., the trim set piece) of the wire and the seat cover must be searched for by feel. There is a need to be able to easily remove the seat cover when making adjustments during assembly or when recycling, and this need is unable to be met by a structure that only allows the seat cover to be removed by an operation from one direction such as this.

SUMMARY OF THE INVENTION

The invention thus provides a vehicle seat having a seat cover that is attached to a base member in such a manner that facilitates removal of the seat cover.

One aspect of the invention relates to a vehicle seat that includes a seat cover to which an engaging portion is attached, and a base member that supports the seat cover and that has an engagable portion that engages with the engaging portion. When the engaging portion and the engagable portion are engaged, the engaging portion and the engagable portion are disengaged by at least one of the engaging portion and the engagable portion being displaced to a predetermined form. A first pressing surface and a second pressing surface are formed on at least one of the engaging portion and the engagable portion, and when a force in a first direction is applied to the first pressing surface, or a force in a second direction that is a direction different than the first direction is applied to the second pressing surface, the engaging portion or the engagable portion on which the first pressing surface or the second pressing surface is formed is displaced to the predetermined form.

According to this aspect, the engaging portion and the engagable portion are able to be disengaged by not only an operation from the first direction, but also by an operation from the second direction. As a result, workability (operability) when removing the seat cover from the base member is improved.

Also, a groove inside of which the engaging portion and the engagable portion are engaged may be formed in the base member. The second pressing surface may be inclined with respect to a plane orthogonal to a direction in which the groove extends. The base member may be configured such that the engaging portion or the engagable portion on which the second pressing surface is formed is displaced to the predetermined form by the force in the second direction that is force in a direction in which the groove extends being applied to the inclined second pressing surface.

According to this structure, the engaging portion and the engagable portion can be disengaged by applying force in the direction in which the groove extends to the second pressing surface, so there is no need to disengage the two by feel. For example, the engaging portion and the engagable portion disengage as a result of the second pressing surface receiving force in the second direction from a rod-shaped tool such as a screwdriver, simply by moving the tool along the groove.

Also, the structure may be such that a tip end of one of the engaging portion and the engagable portion engages with a tip end of the other of the engaging portion and the engagable portion. The second pressing surface may be formed on the engagable portion and be inclined such that a width of the engagable portion gradually decreases toward the tip end of the engagable portion, and a width of the tip end of the engaging portion may be greater than a width of the tip end of the engagable portion. Alternatively, the second pressing surface may be formed on the engaging portion, and be inclined such that a width of the engaging portion gradually decreases toward the tip end of the engaging portion, and a width of the tip end of the engagable portion may be greater than a width of the tip end of the engaging portion.

According to this structure, a valley is created between the engaging portion and the engagable portion by the existence of the inclined second pressing surface. By moving a rod-shaped tool such as that described above along the groove, the tool will slip into the valley and force in the second direction will be applied to the inclined second pressing surface. That is, the tool that applies the force to the second pressing surface is guided by the valley, so workability when removing the seat cover from the base member is even further improved.

With the vehicle seat having this structure, the engaging portion and the engagable portion can be disengaged not only by an operation from the first direction, but also by an operation from the second direction. Thus, workability when removing the seat cover from the base member is improved.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
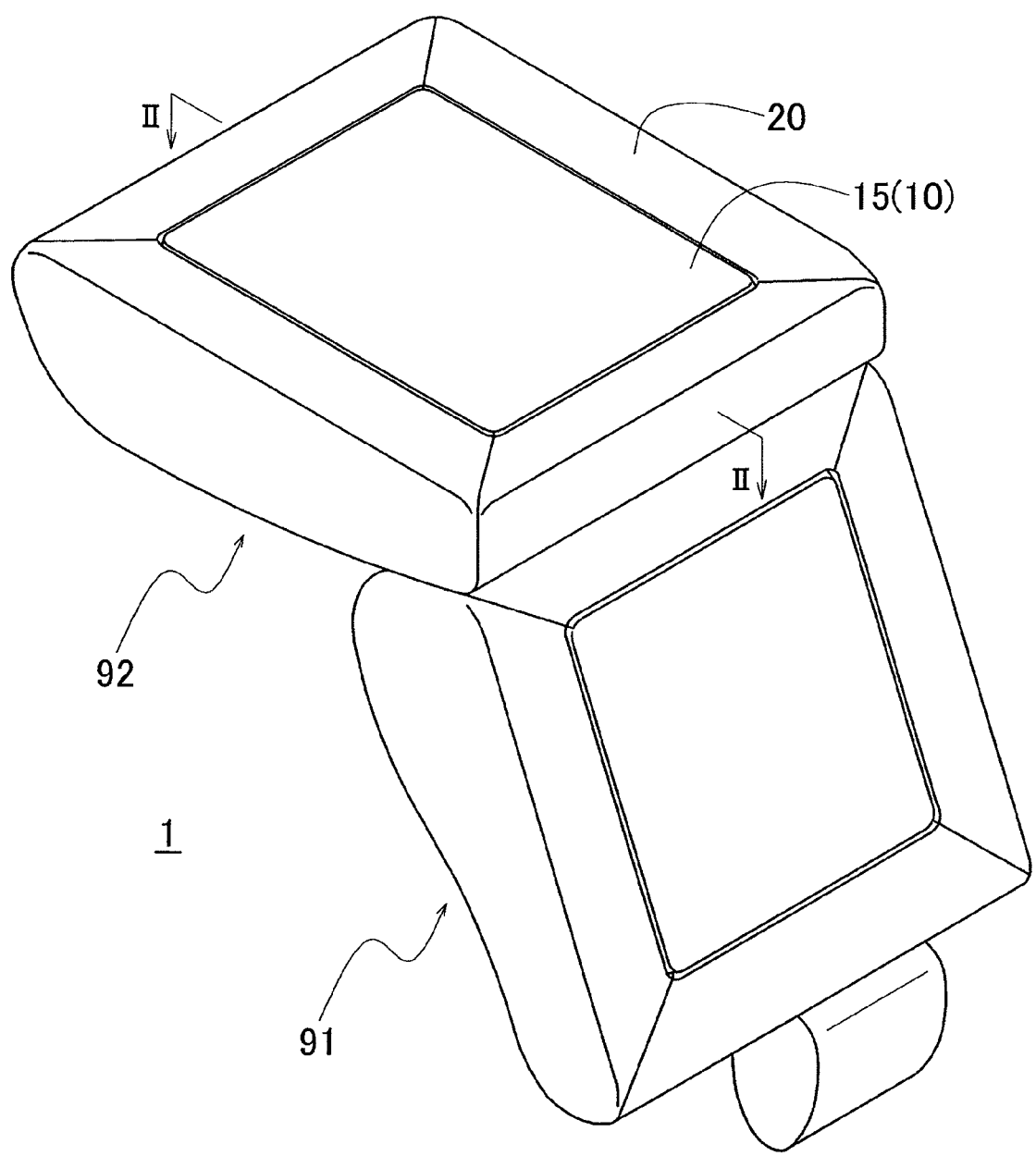
FIG. 1 is an external view a vehicle seat according to one example embodiment of the invention as viewed from below.

Hereinafter, example embodiments of the invention will be described in detail with reference to the accompanying drawings. A vehicle seat 1 according to one example embodiment includes a seat cover 20, and a base member 10 that supports this seat cover 20. The seat cover 20 is a cover member that covers a surface of a seat pad 40 that is a cushion. The base member 10 is a plate-shaped member that is provided on a back surface of a seat pad 91 or a seat cushion 92 (i.e., a back surface in the case of the seat pad 91, and a lower surface in the case of the seat cushion 92). This base member 10 may be referred to as a "backboard" or the like. Hereinafter, each structure will be described in detail. In the description below, the structure of the seat cushion 92 is given as an example, but a similar structure can also be applied to the seat pad 91.

A seat frame 30 that is a frame of a seat has a main frame 31 and a sub frame 32. The main frame 31 is a relatively thick shaft-like portion formed in a generally rectangular shape following the outline of the seat cushion 92. The sub frame 32 is a shaft-like portion that is thinner than the main frame 31, and is attached extending across the main frame 31. The seat cushion 92 is attached gripping the main frame 31 at a front end portion and a rear end portion.

The base member 10 is a plate-shaped member having a generally rectangular shape that forms the back surface of the seat cushion 92. A two-pronged frame attaching portion 14 is formed on the surface on one side. The base member 10 is attached to the seat frame 30 by this two-pronged frame attaching portion 14 gripping the sub frame 32.

A groove 11 that follows a peripheral edge of the base member 10 is formed in the surface on other side of the base member 10. An engagable portion 12 is formed inside this groove 11. The engagable portion 12 is a cover-attaching pawl portion that is formed in plurality on an inside surface 111 of the groove 11. The engagable portion 12 is connected to a main body portion of the base member 10 at a portion along an inside side edge of an opening of the groove 11, and is able to elastically deform with this portion as the fulcrum (hereinafter this portion may also be referred to as "base end 121"). Meanwhile, an engagable pawl 122 that protrudes toward an outside surface 112 of the groove 11 is formed on a tip end side of the engagable portion 12 (i.e., on the side opposite the base end 121). A tip end of this engagable pawl 122 (i.e., a tip end portion 122c of the engagable portion 12) serves as an engaging portion that engages with a tip end portion 213a of an engaging pawl 213 of an engaging portion 21 that will be described in detail later. The engagable pawl 122 of the engagable portion 12 moves farther away from the outside surface 112 of the groove 11 as the engagable portion 12 elastically deforms with the base end 121 as the fulcrum.

Figure 2:
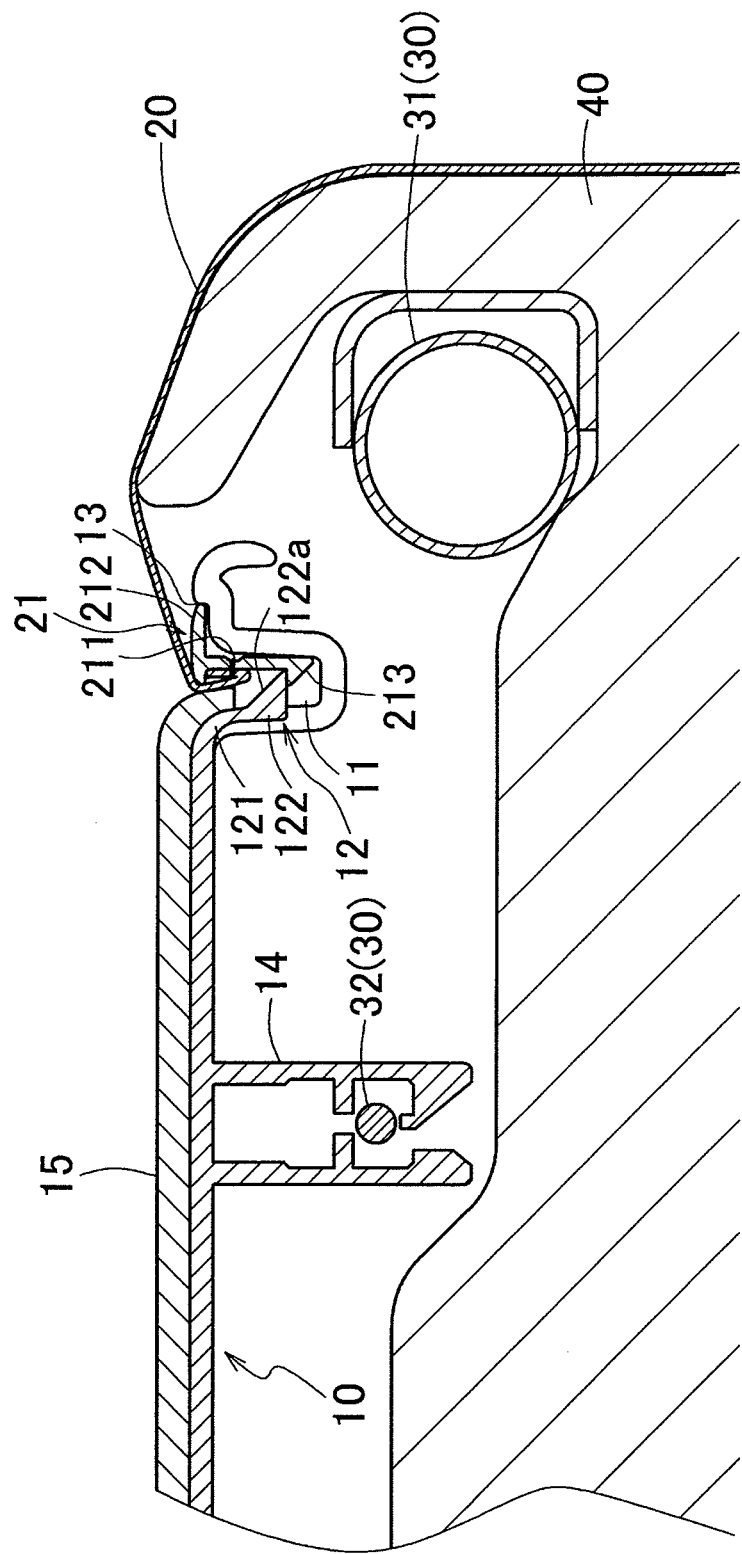
FIG. 2 is a sectional view (i.e., a sectional view taken along line A-A in FIG. 1) of the vehicle seat according to the example embodiment of the invention.
Figure 3:
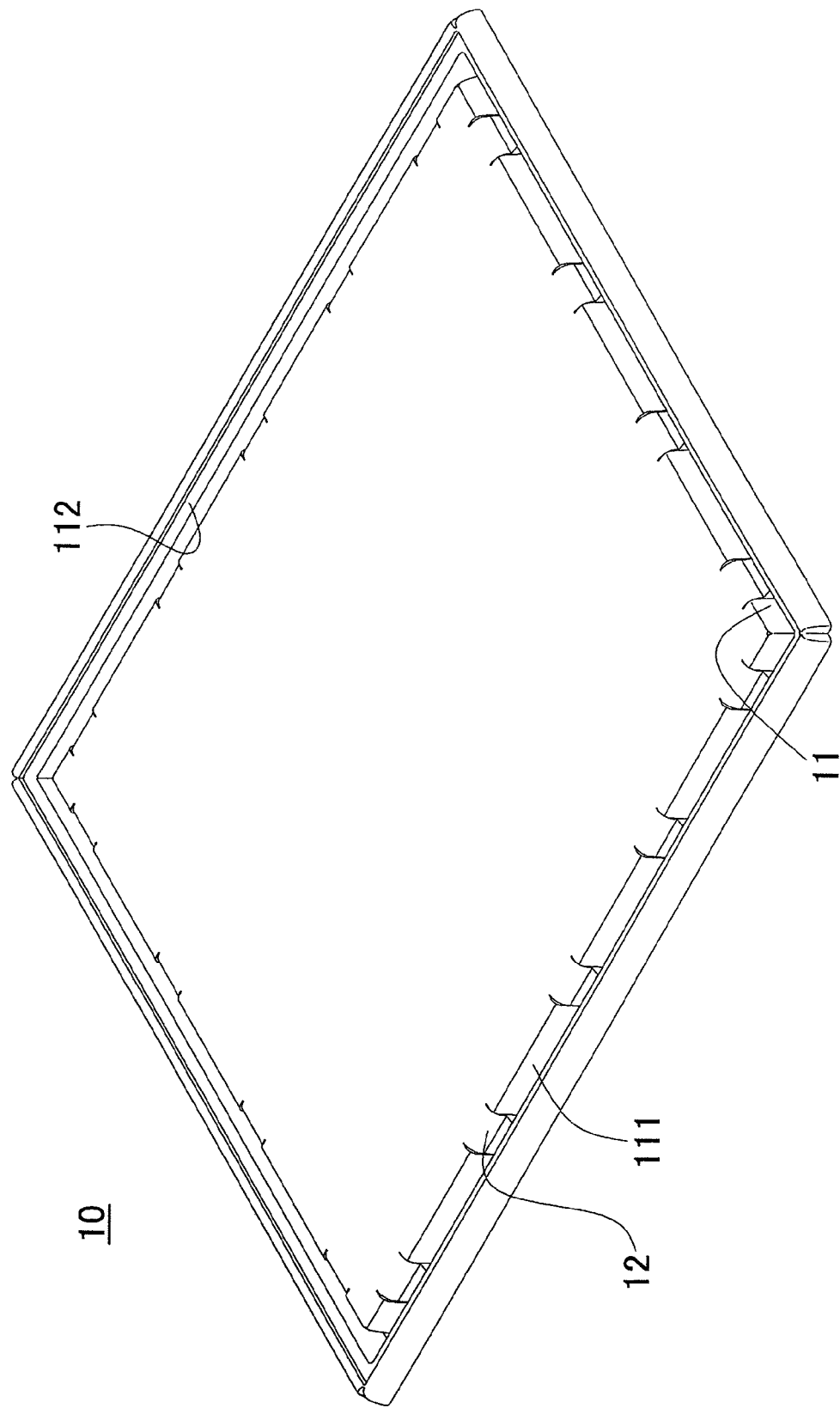
FIG. 3 is an external view of a base member provided with the vehicle seat according to the example embodiment of the invention.

The surface of this engagable pawl 122 on the open side of the groove 11 (i.e., the upper surface in FIG. 2) is inclined such that a thickness in the vertical direction gradually decreases closer to the outside surface 112 of the groove 11. That is, the surface of this engagable pawl 122 on the open side of the groove 11 is inclined so as to be closer to the bottom surface of the groove 11 closer to the outside surface 112 of the groove 11. This surface serves as a first pressing surface 122a of the invention. Meanwhile, both side surfaces in a width direction of this engagable pawl 122 (i.e., the direction along the groove 11) are inclined such that the width gradually decreases closer to the outside surface 112 of the groove 11. Each of these surfaces serves as a second pressing surface 122b of the invention.

Also, a retaining portion 13 is formed to the outside of the groove 11 in the base member 10. This retaining portion 13 is a stepped portion that is formed by depressing the outside of the opening of the base member 10 a predetermined amount. This retaining portion 13 retains the engaging portion 21 that will be described later so that it will not slip out.

Carpet 15 is affixed in a generally rectangular-shaped region to the inside of the groove 11 in the base member 10. The determination as to whether to use this kind of carpet 15 may be made as appropriate.

The seat cover 20 is attached to the base member 10 so as to cover the surface of the seat pad 40. The engaging portion 21 that is a pawl portion that engages with the engagable portion 12 is attached to a peripheral edge of the seat cover 20. The engaging portion 21 is attached to the seat cover 20 by a cover attaching portion 211 provided on a base end side of the engaging portion 21 being sewn to the seat cover 20. The base end side of the engaging portion 21 that includes this cover attaching portion 211 is formed having a generally T-shaped cross-section. More specifically, a portion (hereinafter referred to as "hooked portion 212") that extends in a direction substantially orthogonal to the cover attaching portion 211 that is sewn to the seat cover 20 is formed.

Meanwhile, the engaging pawl 213 is formed on a tip end of the engaging portion 21. The engaging pawl 213 is a portion having an arrowhead shape (i.e., a shape of half an arrowhead) with a pointed tip when viewed in a sectional view. A tip end of a portion that bends at an angle upward from a portion that extends straight from the cover attaching portion 211 (i.e., the tip end portion 213a of the engaging portion 21) becomes the engaging portion of the engagable pawl 122 of the engagable portion 12.

Only one engaging portion 21 may be provided for each edge of the seat cover 20, or the engaging portion 21 may be divided into a plurality for each edge, such that one engaging portion 21 engages with one engagable portion 12. However, even if the engaging portion 21 is divided into a plurality, it is preferable that the width (i.e., the size in the direction along the groove 11) of the tip end portion 213a (i.e., the engaging pawl 213) of the engaging portion 21 be greater than the width (i.e., the size in the direction along the groove 11) of the tip end portion 122c (i.e., the engagable pawl 122) of the engagable portion 12. As a result, a generally V-shaped valley is created between the engagable portion 12 and the engaging portion 21 that are in an engaged state, by the existence of the inclined second pressing surface 122b, which is beneficial when removing the seat cover 20 using a second method that will be described later.

Hereinafter, attachment and removal of the seat cover 20 with respect to the base member 10 using the engagable portion 12 and the engaging portion 21 will be described.

Figure 4A:
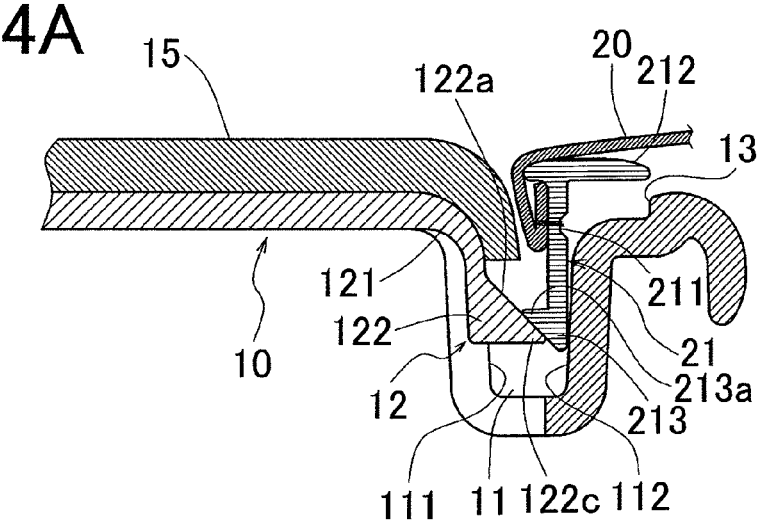
FIGS. 4A-4C are sectional views illustrating a procedure for attaching a seat cover to the base member.
Figure 4B:
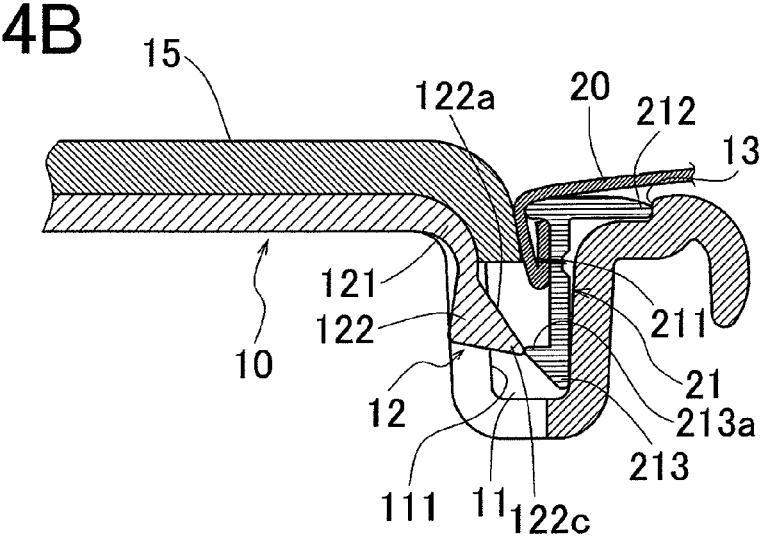
Figure 4C:
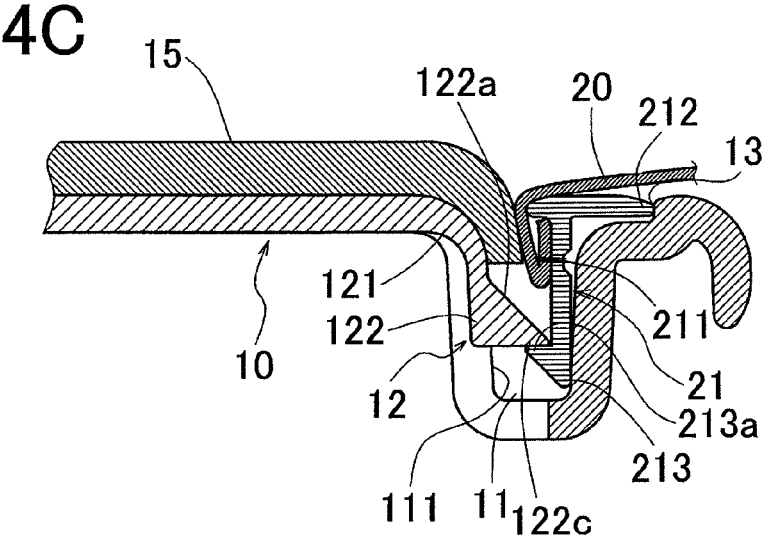

The peripheral edge of the seat cover 20 where the engaging portion 21 is provided is attached to the base member 10 on the back side of the seat, with the seat cover 20 covering the surface of the seat pad 40. When the engaging portion 21 is inserted into the groove 11 of the base member 10 (FIG. 4A), the engagable pawl 122 is pressed against by the inclined surface of the engaging pawl 213 (i.e., the arrowhead-shaped portion), such that the engagable portion 12 elastically deforms in a direction away from the outside surface 112 of the groove 11 with the base end 121 as the fulcrum (FIG. 4B). When the engagable portion 12 elastically deforms to a predetermined form, the engaging pawl 213 slips under the engagable pawl 122, and the engagable portion 12 returns to the original state that it was in before being elastically deformed (FIG. 4C). As a result, the tip end of the engaging pawl 213 hooks on the tip end of the engagable pawl 122.

When the engaging pawl 213 hooks on the engagable pawl 122, the hooked portion 212 of the engaging portion 21 catches on the retaining portion 13 that is the stepped portion formed on the base member 10. The seat cover 20 attaches to the seat pad 40 with enough tension so as not to wrinkle. As a result, the engaging portion 21 is constantly pulled toward the outside of the groove 11 by this tension of the seat cover 20. Therefore, the engaging portion 21 that is engaged with the engagable portion 12 will not come undone due to the tension of the seat cover 20, as a result of the hooked portion 212 of the engaging portion 21 being hooked on the retaining portion 13 as described above.

When the engaging portion 21 is engaged with the engagable portion 12 along the entire peripheral edge of the seat cover 20 in this way, the seat cover 20 is attached to the seat pad 40 with enough tension so as not to wrinkle.

There are two methods, both of which are described below, to remove the seat cover 20 that is attached to (i.e., supported by) this base member 10, from the base member 10.

Figure 5A:
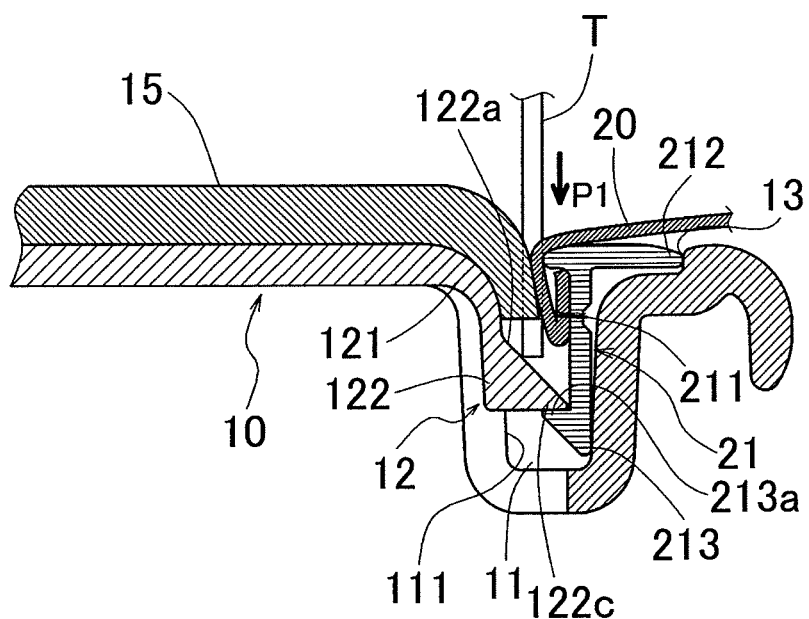
FIGS. 5A and 5B are sectional views illustrating a procedure (a first method) for removing the seat cover that is attached to the base member.
Figure 5B:
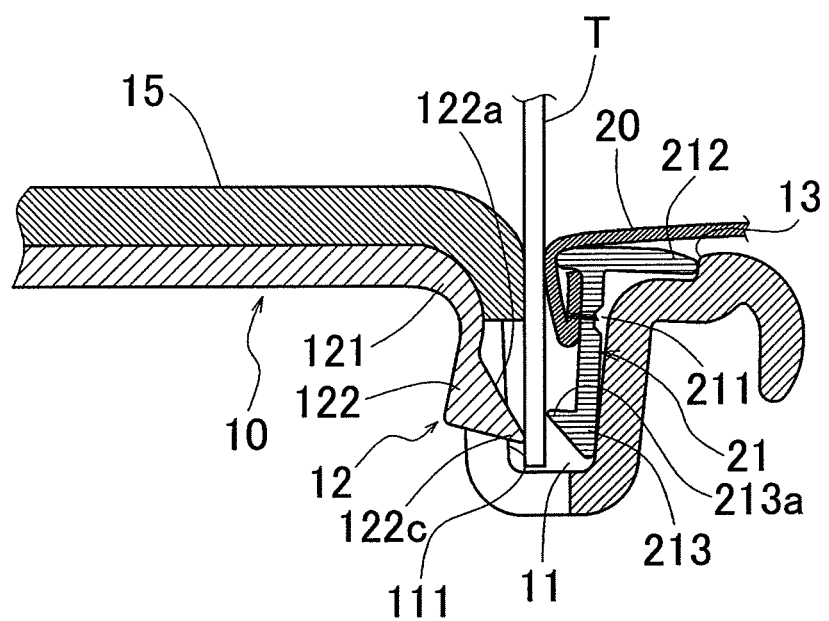
Figure 6A:
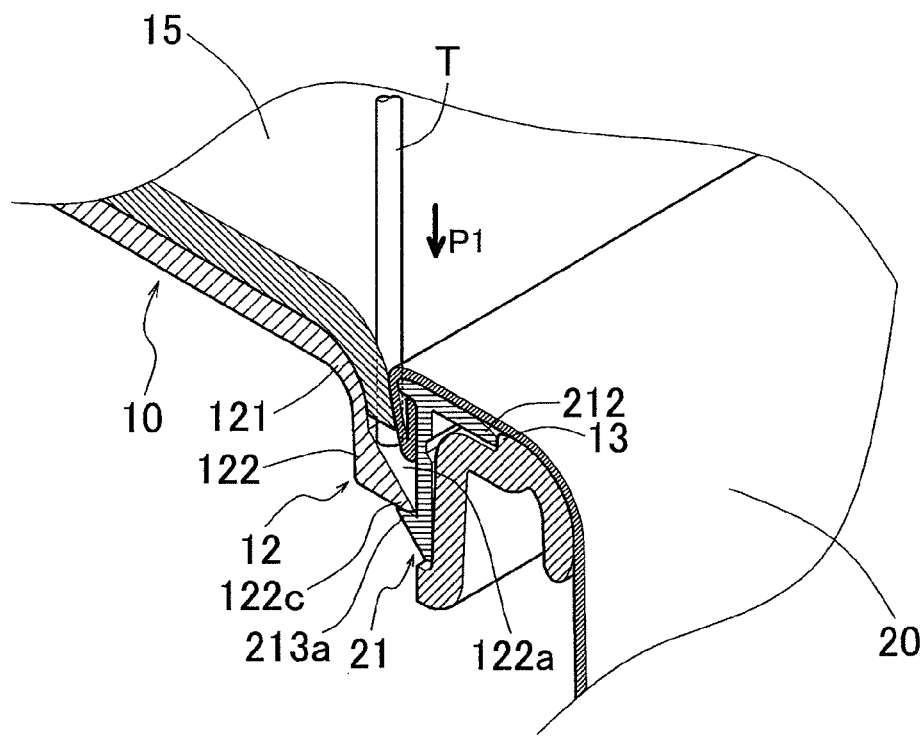
FIGS. 6A and 6B are three-dimensional sectional views illustrating the procedure (the first method) for removing the seat cover that is attached to the base member.
Figure 6B:
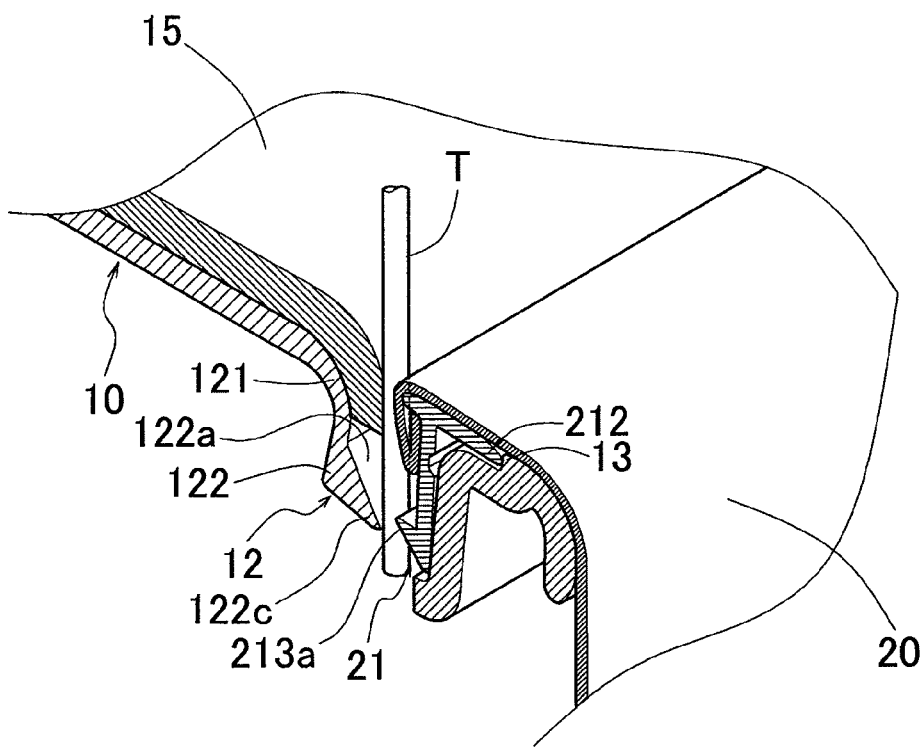

A first method is a method that involves pressing on the first pressing surface 122a. More specifically, as shown in FIGS. 5A and 5B and 6A and 6B, the first pressing surface 122a is pressed on from the open side of the groove 11. That is, the first pressing surface 122a is pressed on with a force P1 in a direction substantially orthogonal to the direction in which the groove 11 extends (FIGS. 5A and 6A). In this example embodiment, this pressing direction corresponds to a first direction of the invention. As described above, the first pressing surface 122a is inclined so as to gradually become close to the bottom surface of the groove 11 closer to the outside surface 112 of the groove 11. Therefore, when force is applied to the first pressing surface 122a from the first direction, the engagable portion 12 elastically deforms in a direction away from the outside surface 112 of the groove 11, with the base end 121 as the fulcrum. When the engagable portion 12 elastically deforms to a predetermined form, the engagable pawl 122 slips under the engaging pawl 213, such that the engaging pawl 213 is no longer under the engagable pawl 122 (FIGS. 5B and 6B). As a result, the tip end of the engaging pawl 213 is no longer hooked on the tip end of the engagable pawl 122. Using a thin long rod-shaped tool T (such as a flat-blade screwdriver, for example) as the member that presses on the first pressing surface 122a, as shown in the drawing, facilitates the work of removing the seat cover 20.

Figure 7A:
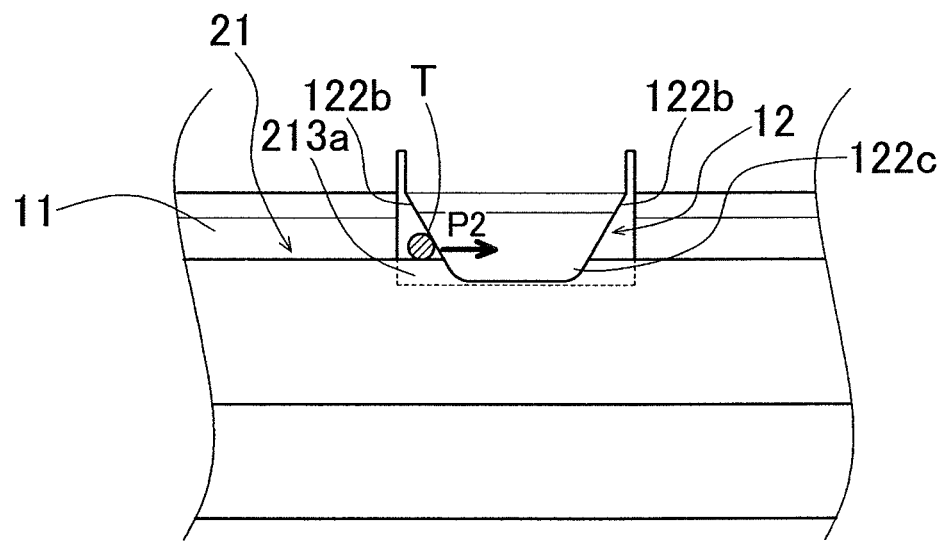
FIGS. 7A and 7B are views (i.e., views showing frame formats from the open side of a groove) illustrating a procedure (a second method) for removing the seat cover that is attached to the base member.
Figure 7B:
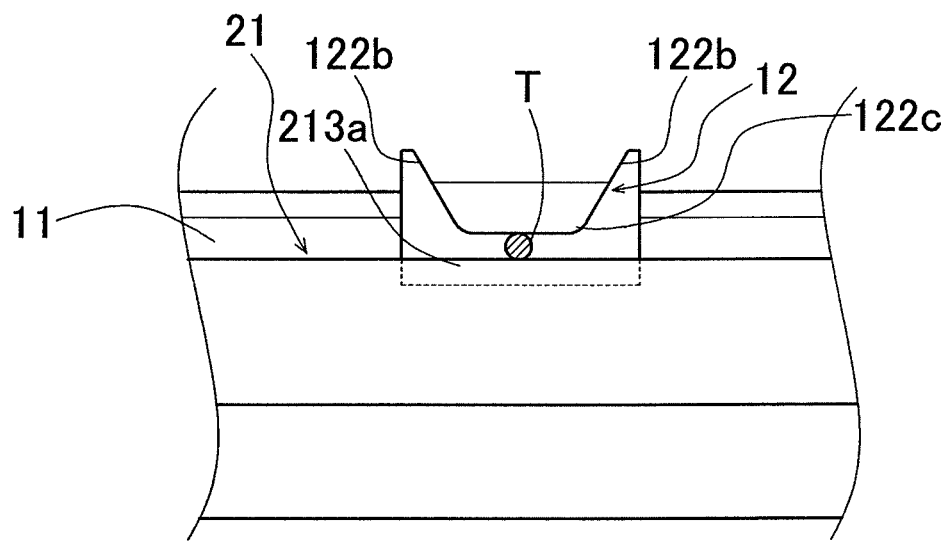
Figure 8A:
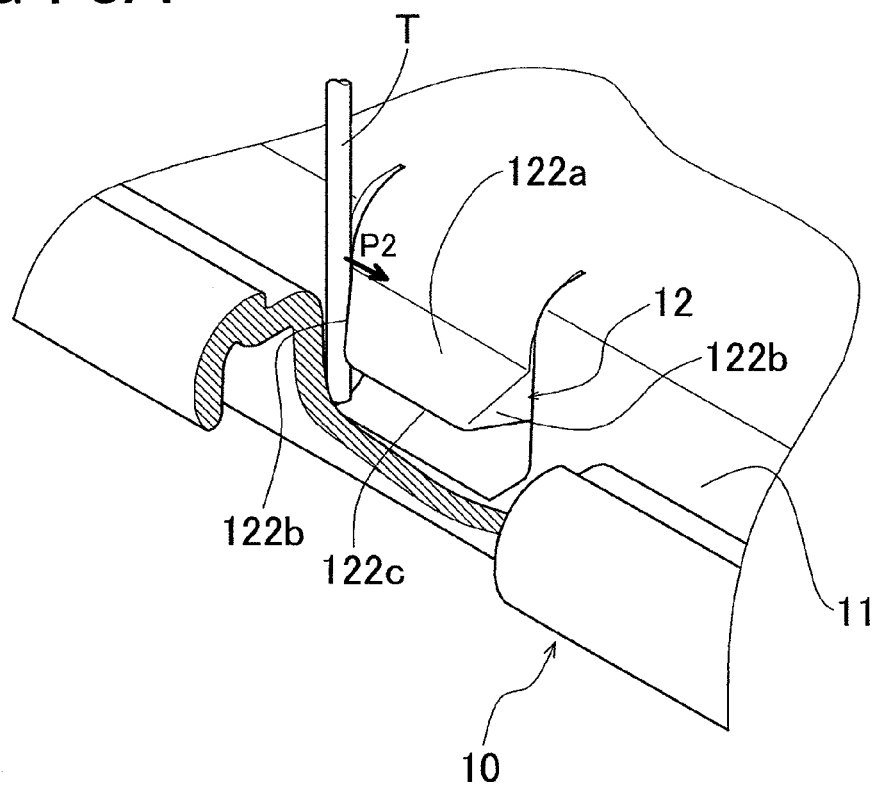
FIGS. 8A and 8B are three-dimensional sectional views illustrating the procedure (the second method) for removing the seat cover that is attached to the base member (only the base member is shown to facilitate understanding of the drawing).
Figure 8B:
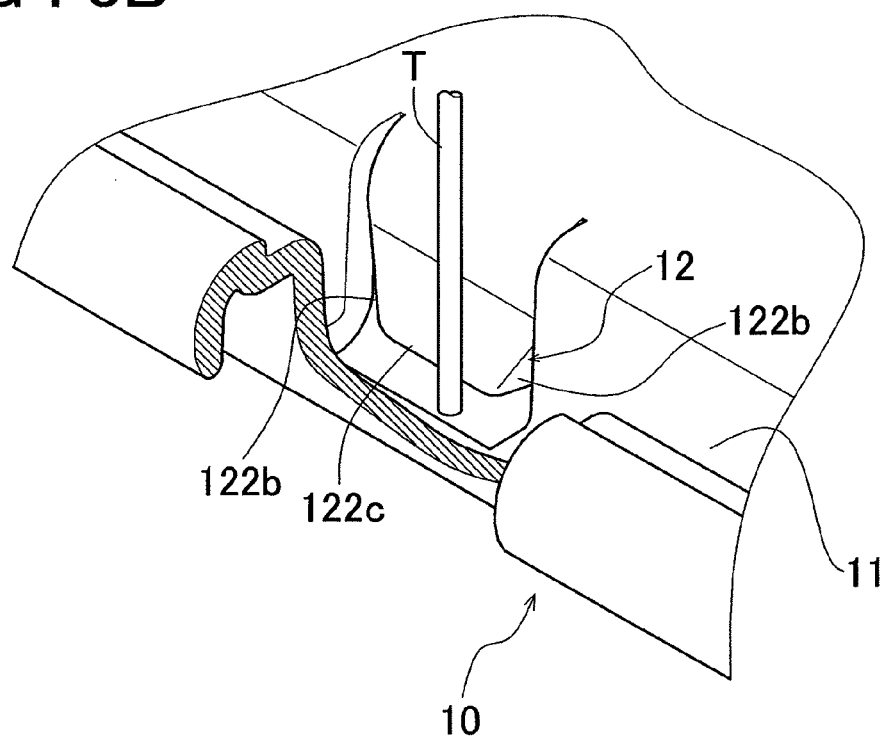

The second method is a method that involves pressing on the second pressing surface 122b. More specifically, as shown in FIGS. 7A and 7B and 8A and 8B, the second pressing surface 122b is pressed on by a force P2 in the direction along the groove 11 (FIGS. 7A and 8A). In this example embodiment, this pressing direction corresponds to a second direction of the invention. As described above, the second pressing surface 122b is inclined such that the width (i.e., the size in the direction along the groove 11) gradually decreases closer toward the outside surface 112 of the groove 11, so when a force is applied to the second pressing surface 122b from the second direction, the engagable portion 12 elastically deforms in a direction away from the outside surface 112 of the groove 11, with the base end 121 as the fulcrum. When the engagable portion 12 elastically deforms to a predetermined form, the engagable pawl 122 slips under the engaging pawl 213, such that the engaging pawl 213 is no longer under the engagable pawl 122 (FIGS. 7B and 8B). As a result, the tip end of the engaging pawl 213 is no longer hooked on the tip end of the engagable pawl 122.

A thin, long rod-shaped tool T, such as that shown in the drawing, may be used as the member that presses on the second pressing surface 122b. In this example embodiment, the width (i.e., the size in the direction along the groove 11) of the tip end portion 213a (i.e., the engaging pawl 213) of the engaging portion 21 is greater than the width (i.e., the size in the direction along the groove 11) of the tip end portion 122c (i.e., the engagable pawl 122) of the engagable portion 12, so a generally V-shaped valley is created between the engagable portion 12 and the engaging portion 21 that are in an engaged state, by the existence of the inclined second pressing surface 122b. Therefore, by moving the rod-shaped tool T is moved along the groove 11, the tool T will slip into the valley, such that the force P2 in the second direction will be applied to the inclined second pressing surface 122b. That is, the tool T that applies the force to the second pressing surface 122b is guided by the valley, so workability when removing the seat cover 20 from the base member 10 is even further improved. Also, when the engagable portion 12 elastically deforms to the predetermined faun, the rod-shaped tool T slips between the tip end of the engagable pawl 122 of the engagable portion 12 and the tip end of the engaging pawl 213, so the tip end of the engaging pawl 213 can more easily be unhooked from the tip end of the engagable pawl 122.

The second pressing surface 122b is formed on both sides in the width direction of the engagable portion 12, so the engaging portion 21 can also be disengaged from the engagable portion 12 from the direction opposite that shown in the drawing.

In this way, the seat cover 20 can be removed from the base member 10 by disengaging the engaging portion 21 from the engagable portion 12 along the entire peripheral edge of the seat cover 20 using at least one of the first method and the second method.

According to the vehicle seat 1 of this example embodiment described above, when removing the seat cover 20 from the base member 10, the engaging portion 21 can be disengaged from the engagable portion 12 not only by an operation from the first direction (i.e., the first method), but also by an operation from the second direction (i.e., the second method). Thus, the work (the operation) of removing the seat cover 20 is improved.

In particular, the operation from the second direction (i.e., the second method) is an operation in which the force in the direction in which the groove 11 extends is applied to the second pressing surface 122b, so there is no need to disengage the two by searching for the engaging portion by feel. As described above, the engaging portion 21 disengages from the engagable portion 12 as a result of the second pressing surface 122b receiving the force P2 in the second direction from the tool T, simply by moving the rod-shaped tool T along the groove 11. Also, even when a plurality of engagable portions 12 are provided along the groove 11, as in this example embodiment, the engaging portions 21 are successively disengaged from the engagable portions 12 simply by moving the tool T along the groove 11, so work time is able to be shortened.

Heretofore, an example embodiment of the invention has been described in detail, but the invention is not limited in any way to this example embodiment. To the contrary, the invention is intended to cover various modifications within the scope of the invention.

For example, in the example embodiment described above, the engaging portion 21 is disengaged from the engagable portion 12 by elastically deforming the engagable portion 12 to a predetermined form. However, the structure is not limited to one that "elastically deforms" when disengaging. That is, the structure is not limited as long as it deforms or moves the engagable portion 12 to a predetermined form such that the engagable portion 12 is able to engage with the engaging portion 21 again after the the engagable portion 12 is disengaged from engaging portion 21. That is, the term "displace" in the invention includes the concepts of deform and move aside from "elastically deform".

Also, in the example embodiment described above, the first pressing surface 122a and the second pressing surface 122b are formed on the engagable portion 12, but such a first pressing surface and second pressing surface may also be formed on the engaging portion. That is, the structure may also be such that the engaging portion disengages from the engagable portion by deforming or moving the engaging portion. Also, this kind of first pressing surface and second pressing surface may be formed on both the engaging portion and the engagable portion.

What is claimed is:

1. A vehicle seat comprising:
   a seat cover to which an engaging portion is attached; and
   a base member that supports the seat cover and that has an engagable portion that engages with the engaging portion, wherein
   a first pressing surface and a second pressing surface are provided on at least one of the engaging portion and the engagable portion,
   a groove is provided in the base member such that the engaging portion and the engagable portion are engaged to one another inside the groove, and
   the engagable portion is connected to the base member along an inside edge of the groove so as to be elastically deformable to a position substantially outside of the groove in a direction away from an outside surface of the groove, and
   when the engaging portion and the engagable portion are engaged, the engaging portion and the engagable portion are disengageable by at least one of the engaging portion and the engagable portion being displaced to a predetermined form, and
   when a force in a first direction is applied to the first pressing surface, or a force in a second direction that is a direction different than the first direction is applied to the second pressing surface, the at least one of the engaging portion and the engagable portion on which the first pressing surface and the second pressing surface are provided is displaced to the predetermined form.

2. The vehicle seat according to claim 1, wherein
   the second pressing surface is inclined with respect to a plane orthogonal to a direction in which the groove extends, and
   the base member is configured such that the at least one of the engaging portion and the engagable portion on which the second pressing surface is provided is displaced to the predetermined form by the force in the second direction that is a force in a direction in which the groove extends being applied to the inclined second pressing surface.

3. The vehicle seat according to claim 2, wherein
   a tip end of one of the engaging portion and the engagable portion engages with a tip end of the other of the engaging portion and the engagable portion,
   the second pressing surface is provided on the engagable portion and is inclined such that a width of the engagable portion gradually decreases toward the tip end of the engagable portion, and
   a width of the tip end of the engaging portion is greater than a width of the tip end of the engagable portion.

4. The vehicle seat according to claim 2, wherein
   a tip end of one of the engaging portion and the engagable portion engages with a tip end of the other of the engaging portion and the engagable portion,
   the second pressing surface is provided on the engaging portion, and is inclined such that a width of the engaging portion gradually decreases toward the tip end of the engaging portion, and
   a width of the tip end of the engagable portion is greater than a width of the tip end of the engaging portion.

5. The vehicle seat according to claim 2, wherein
   a retaining portion is provided farther toward a seat end portion side than the groove, on the base member, and
   the retaining portion is a step provided on the base member, such that the engaging portion hooks onto the retaining portion when the engaging portion is engaged with the engagable portion.

6. The vehicle seat according to claim 5, wherein
   a hook portion is provided on the engaging portion and hooked on the step of the retaining portion in a direction generally orthogonal to an extending direction of the engaging portion when the engaging portion is engaged with the engagable portion.

7. A vehicle seat comprising:
   a seat cover to which an engaging portion is attached; and
   a base member that supports the seat cover and that has an engagable portion that engages with the engaging portion, wherein
   a first pressing surface and a second pressing surface are provided on at least one of the engaging portion and the engagable portion,
   a groove is provided in the base member such that the engaging portion and the engagable portion are engaged to one another inside the groove,
   a retaining portion is provided farther toward a seat end portion side than the groove, on the base member,
   the second pressing surface is inclined with respect to a plane orthogonal to a direction in which the groove extends,
   the base member is configured such that the at least one of the engaging portion and the engagable portion on which the second pressing surface is provided is displaced to the predetermined form by the force in the second direction that is force in a direction in which the groove extends being applied to the inclined second pressing surface, and
   the retaining portion is a step provided on the base member, such that the engaging portion hooks onto the retaining portion when the engaging portion is engaged with the engagable portion, and
   when the engaging portion and the engagable portion are engaged, the engaging portion and the engagable portion are disengageable by at least one of the engaging portion and the engagable portion being displaced to a predetermined form, and
   when a force in a first direction is applied to the first pressing surface, or a force in a second direction that is a direction different than the first direction is applied to the second pressing surface, the at least one of the engaging portion and the engagable portion on which the first pressing surface and the second pressing surface are provided is displaced to the predetermined form.

* * * * *